United States Patent
Kuisma (10) Patent No.: US 7,426,863 B2
(45) Date of Patent: Sep. 23, 2008

(54) METHOD OF MANUFACTURING A CAPACITIVE ACCELERATION SENSOR, AND A CAPACITIVE ACCELERATION SENSOR

(75) Inventor: Heikki Kuisma, Helsinki (FI)

(73) Assignee: VTI Technologies Oy, Vantaa (FI)

( * ) Notice: Subject to any disclaimer, the term of this patent is extended or adjusted under 35 U.S.C. 154(b) by 68 days.

(21) Appl. No.: 11/453,912

(22) Filed: Jun. 16, 2006

(65) Prior Publication Data

US 2007/0000323 A1    Jan. 4, 2007

(30) Foreign Application Priority Data

Jun. 17, 2005    (FI)    ................................. 20055323

(51) Int. Cl.
*G01P 15/125* (2006.01)
(52) U.S. Cl. .................................. 73/514.32
(58) Field of Classification Search .............. 73/514.32, 73/510
See application file for complete search history.

(56) References Cited

U.S. PATENT DOCUMENTS

| | | | | |
|---|---|---|---|---|
| 4,483,194 A | * | 11/1984 | Rudolf | ..................... 73/514.32 |
| 4,699,006 A | * | 10/1987 | Boxenhorn | ............... 73/514.32 |
| 4,736,629 A | * | 4/1988 | Cole | ........................ 73/514.32 |
| 5,659,195 A | | 8/1997 | Kaiser et al. | |
| 5,905,203 A | * | 5/1999 | Flach et al. | ............... 73/514.32 |
| 6,230,566 B1 | | 5/2001 | Lee et al. | |
| 6,595,055 B1 | * | 7/2003 | Schenk et al. | ............. 73/514.32 |
| 7,140,250 B2 | * | 11/2006 | Leonardson et al. | ...... 73/514.32 |
| 2004/0221650 A1 | | 11/2004 | Lehtonen | |

FOREIGN PATENT DOCUMENTS

| | | |
|---|---|---|
| FR | 2694403 | 2/1994 |
| JP | 05142251 | 6/1993 |
| WO | WO 2006/091385 | 8/2006 |

* cited by examiner

*Primary Examiner*—John E Chapman
(74) *Attorney, Agent, or Firm*—Squire, Sanders & Dempsey, LLP

(57) ABSTRACT

The present invention relates to measuring devices used in measuring acceleration and, more precisely, to capacitive acceleration sensors. The object of the invention is to provide an improved method of manufacturing a capacitive acceleration sensor, and to provide a capacitive acceleration sensor, which is applicable for use in small capacitive acceleration sensor solutions, and which, in particular, is applicable for use in small and extremely thin capacitive acceleration sensor solutions measuring acceleration in relation to several axes.

18 Claims, 8 Drawing Sheets

PRIOR ART

Figure 1

PRIOR ART

Figure 2

PRIOR ART

METHOD OF MANUFACTURING A CAPACITIVE ACCELERATION SENSOR, AND A CAPACITIVE ACCELERATION SENSOR

FIELD OF THE INVENTION

The present invention relates to measuring devices used in the measuring of acceleration, and, more precisely, to capacitive acceleration sensors. The object of the present invention is to provide an improved method of manufacturing a capacitive acceleration sensor, and to provide a capacitive acceleration sensor, which is applicable for use in small capacitive acceleration sensor solutions, and which is particularly suitable for use in small and extremely thin capacitive acceleration sensor solutions measuring acceleration in relation to several axes.

BACKGROUND OF THE INVENTION

Measuring based on a capacitive acceleration sensor has proved to be an acceleration measuring method of a simple and reliable principle. Capacitive measuring is based on a change in the gap between the two surfaces of a pair of electrodes of the sensor. The capacitance between the surfaces, i.e. the capacity for storing electric charge, depends on the area of the surfaces and the distance between them. Capacitive measuring can be used even at quite low metering ranges of acceleration values.

Generally, small capacitive acceleration sensor structures are based on micromechanical structures manufactured on silicon. The micromechanical structures are typically structures having a thickness exceeding 100 μm, formed by etching a wafer material. An advantage of micromechanical capacitive acceleration sensors is the large mass in relation to the area of the structures, which enables the manufacturing of capacitive acceleration sensors of excellent performance.

Connection and encapsulation methods of prior art presently used in the manufacturing of professional and consumer electronics and the miniaturization of consumer electronics have led to tight requirements regarding the size of micromechanical components, such as capacitive acceleration sensors, and, in particular, regarding the height of the sensor components.

Presently, some prior art capacitive acceleration sensor solutions measuring in relation to several axes are known. Such solutions are described in, for example, the German Patent Announcement Publication DE 10225714, and in U.S. Pat. No. 6,829,937. The acceleration measuring principles described in the publications are based on an asymmetrical support of a mass by means of a torsion spring, such that perpendicular to the spring axis passing through the center of gravity of the mass forms an angle of essentially 45° with the capacitor plates.

Figure 1:
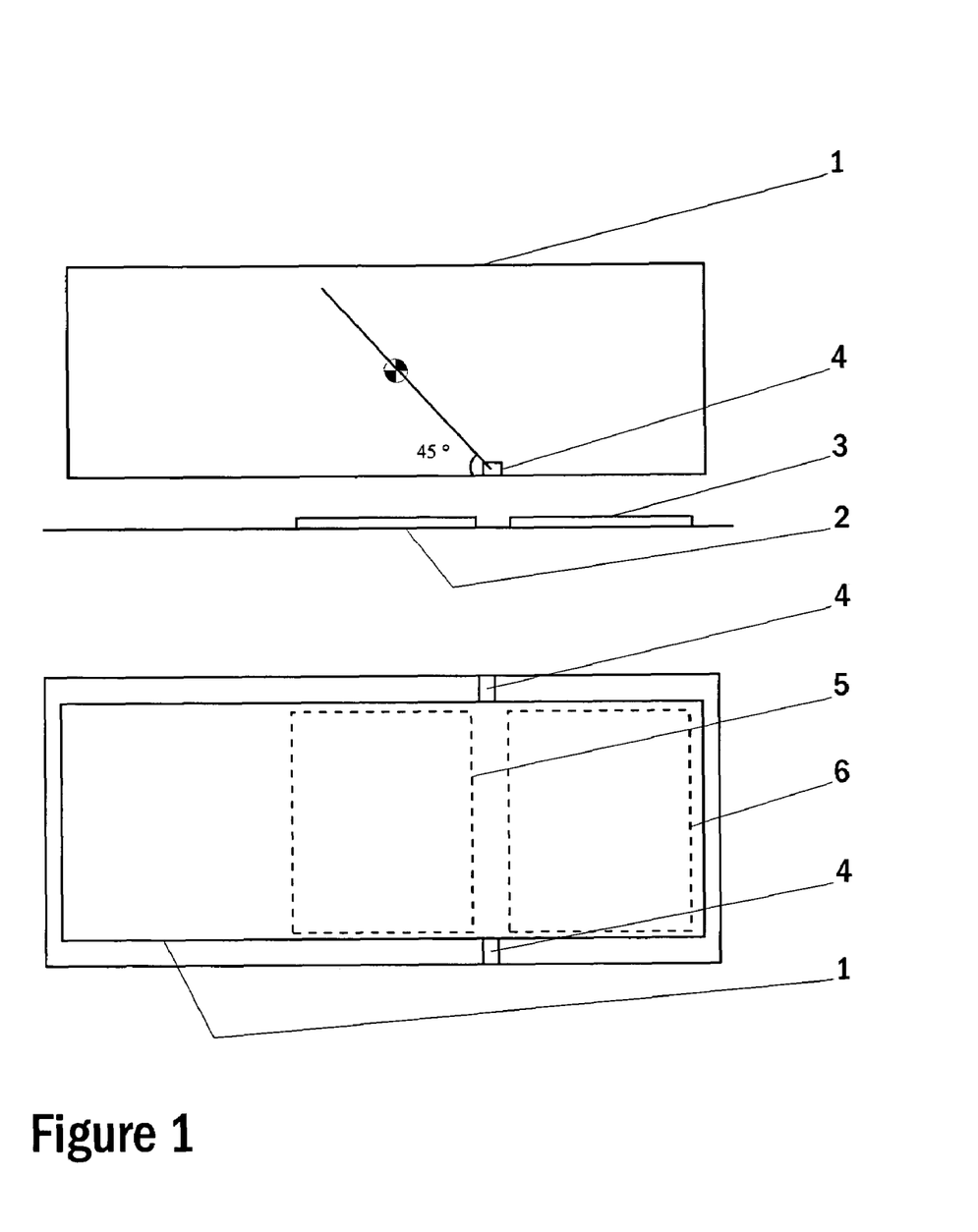
FIG. 1 shows a capacitive acceleration sensor solution, according to prior art, in section and projection view.
Figure 2:
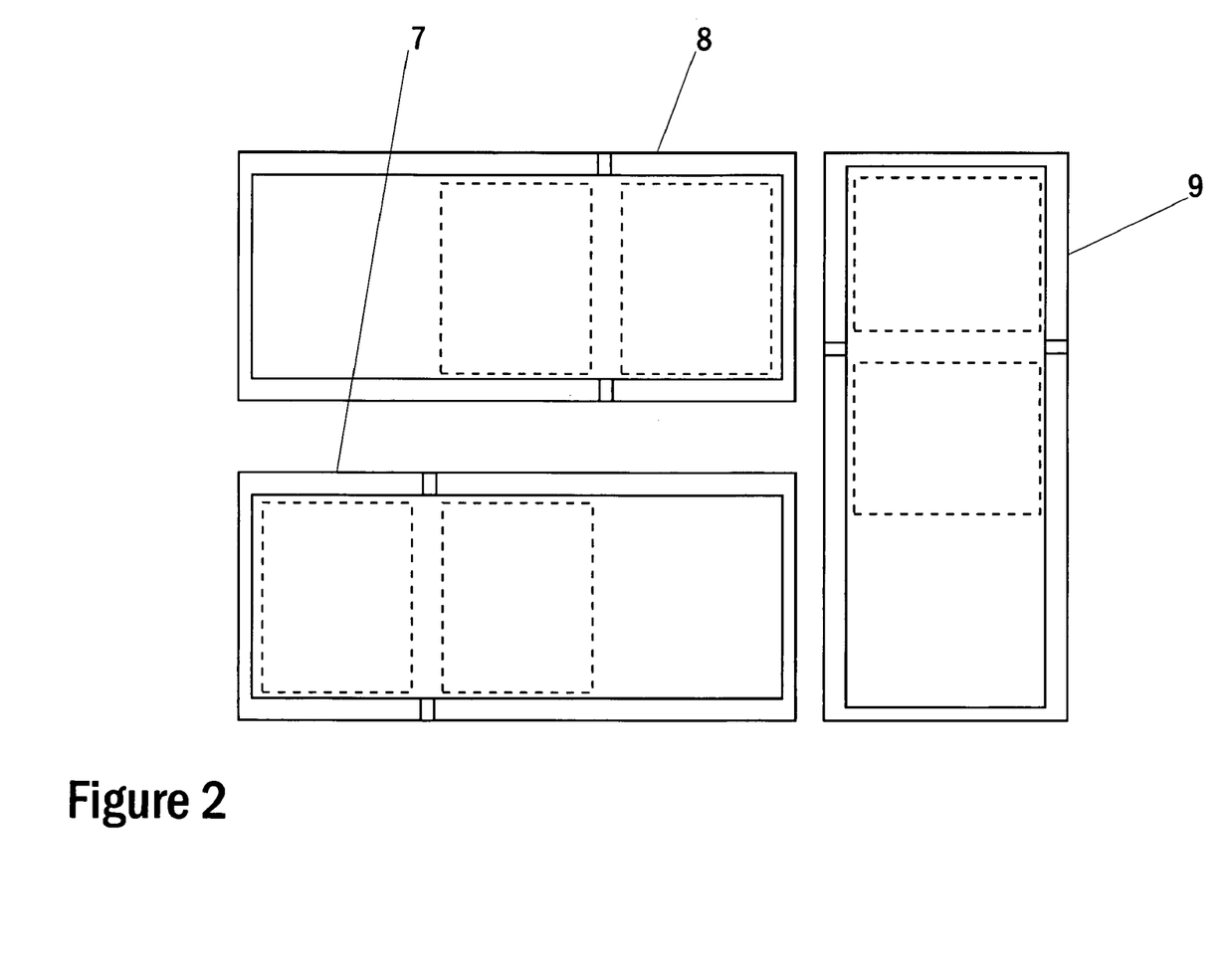
FIG. 2 shows a positioning solution of capacitive acceleration sensor elements, according to prior art, for measuring acceleration in relation to three axes.
Figure 3:
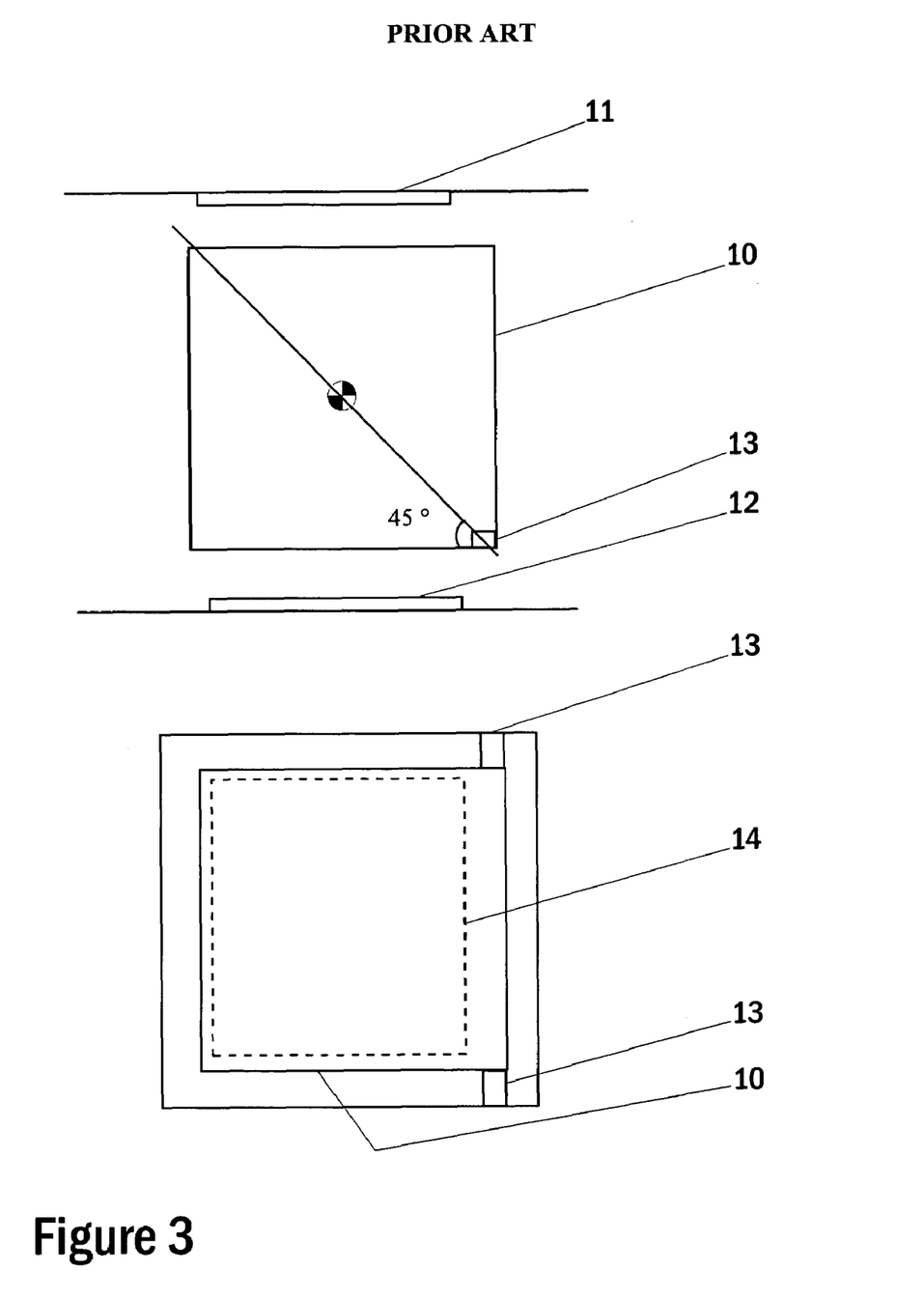
FIG. 3 shows a second capacitive acceleration sensor solution, according to prior art, in section and projection view.
Figure 4:
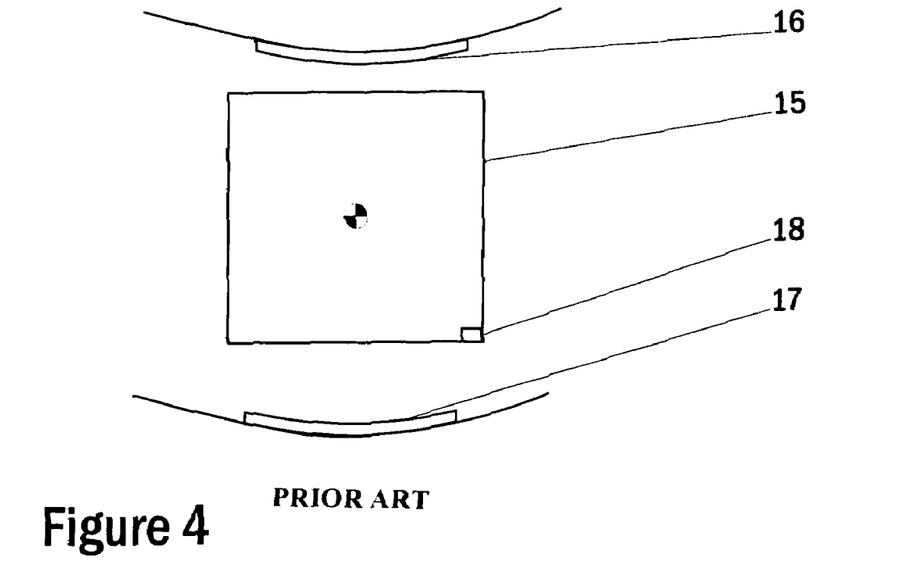
FIG. 4 shows the influence on the distance between the measuring electrode and the mass, from deformation in the second capacitive acceleration sensor solution, according to prior art.

Below, prior art will be described with exemplifying reference to the accompanying drawings, of which:

FIG. 1 shows a capacitive acceleration sensor solution, according to prior art, in section and projection view, FIG. 2 shows a positioning solution of capacitive acceleration sensor elements, according to prior art, for measuring acceleration in relation to three axes, FIG. 3 shows a second capacitive acceleration sensor solution, according to prior art, in section and projection view, and FIG. 4 shows the influence on the distance between the measuring electrode and the mass, from deformation in the second capacitive acceleration sensor solution, according to prior art.

FIG. 1 shows a capacitive acceleration sensor solution, according to prior art, in section and projection view. In the capacitive acceleration sensor solution, according to prior art, the torsion springs 4 supporting the mass 1 of the moving electrode are positioned off-center in the longitudinal direction and at one edge of the mass 1 in the thickness direction. The measuring electrodes 2, 3 are positioned below the mass, symmetrically in relation to the spring axis. In the projection view, the areas of the mass 1, which coincide with the measuring electrodes 2, 3, are depicted by dotted lines.

FIG. 2 shows a positioning solution of capacitive acceleration sensor elements, according to prior art, for measuring acceleration in relation to three axes. In the positioning solution according to prior art, the acceleration sensor elements 7, 8, 9 are positioned for measuring acceleration in relation to three axes. By means of the depicted positioning solution, an acceleration sensor of several axes can be implemented, the directions of measuring of which tune the entire space.

An advantage of the capacitive acceleration sensor solution, according to prior art, shown in FIGS. 1 and 2, is the position of the electrodes in the same plane, and the immunity to deformations of the structure. Deformations of the structure are almost unavoidable, when the sensor is being mechanically and electrically connected, and when it is being protected against chemical influences from the environment. These deformations are caused by differences in the thermal expansion of the materials. The capacitive acceleration sensor solution according to prior art, described above, withstands deformations of the structure extremely well without generating measuring inaccuracy due to null shift.

An advantage of the capacitive acceleration sensor solution, according to prior art, shown in FIGS. 1 and 2, is also, that adjusting the vertical and horizontal sensitivities of the acceleration sensor solution is easily done by changing the angle of the perpendicular to the spring line passing through the center of gravity. If the angle is larger than 45°, a vertical sensitivity smaller than the horizontal sensitivity is achieved, which is useful in many practical applications.

A disadvantage of the capacitive acceleration sensor solution, according to prior art, shown in FIGS. 1 and 2, is the ineffective use of space, as some part of the surface of the mass remains uncovered by electrodes.

FIG. 3 shows a second capacitive acceleration sensor solution, according to prior art, in section and projection view. In the second capacitive acceleration sensor solution, according to prior art, the torsion springs 13, which support the mass 10 of the moving electrode, are positioned in the corners of the mass 10. The measuring electrodes 11, 12 are positioned in two different planes on both sides of the mass 10. In the projection view, the area of the mass 10 coinciding with the measuring electrodes 11, 12 is depicted by a dotted line.

Also in the solution of FIG. 3, the measuring direction is angled by 45° off the plane of the measuring electrodes 11, 12. Asymmetry has been achieved by positioning the torsion springs 13 in the corners of the mass 10. An advantage of the second capacitive acceleration sensor solution, according to prior art, shown in FIG. 3, is an extremely efficient use of the area.

A disadvantage of the second capacitive acceleration sensor solution, according to prior art, shown in FIG. 3, is the position of the measuring electrodes 11, 12 in two planes located far away from each other. The electrodes 11, 12 located in two different planes require great rigidity in the entire structure.

FIG. 4 shows the influence on the distance between the measuring electrode and the mass, from deformation of the second capacitive acceleration sensor solution according to prior art. In the second capacitive acceleration sensor solution, according to prior art, the torsion springs 18 supporting the mass 15 of the moving electrode are positioned in the corners of the mass 15. The measuring electrodes 16, 17 are positioned in two different planes on both sides of the mass 15.

A disadvantage of the second capacitive acceleration sensor solution, according to prior art, shown in FIG. 4, is the disproportion in the distance between the measuring electrodes 16, 17 and the mass 15 caused by bending or some other deformation of the acceleration sensor structure. Deformations of the structure are almost unavoidable, when the sensor is being connected mechanically and electrically and when it is being protected against chemical influences from the environment. These deformations are caused by differences in the thermal expansion of the materials.

FIG. 4 shows how the distances between the mass 15 and the measuring electrodes 16, 17 located on different sides of the mass 15 of the capacitive acceleration sensor solution, according to prior art, change in a mutually different manner, as the sensor bends. The consequence of this is, that the difference between the two capacitances of the sensor changes, i.e. a measuring error caused by a null shift is generated. The situation for the second capacitive acceleration sensor solution, according to prior art, is further complicated by the fact, that the measuring electrodes 16, 17, located on different sides of the mass, can bend independently of each other, if the loading forces and moments are asymmetrical.

A problem with the acceleration sensor solutions according to prior art is the excessive height of the finished sensor component. Nowadays, acceleration sensors are required to have a small area and a good performance.

An advantage of a low height is good installability in modern electronic products. Correspondingly, an advantage of a small area is a low production cost in the wafer process. Further, a good performance often means low noise during the measuring and stability in the device during the measuring. The performance often requires rigidity of the structures.

The capacitive acceleration sensor structure, according to prior art, shown in FIG. 1, wastes area regarding the area of the capacitors. Instead, the presented solution tolerates mechanical deformation, and thus, it can be designed to have much thinner support structures than the solution of FIG. 1.

By means of the second capacitive acceleration sensor solution, according to prior art, shown in FIG. 3, an optimal compromise is achieved regarding the small area required by the manufacturing costs and the large capacitor area required by the performance. The presented solution is, however, particularly bad, when looking for a compromise between thickness and structure rigidity. The capacitor plates located in different planes require very great rigidity of the entire structure.

In the manufacturing of professional and consumer electronics, there is a clearly growing requirement for lower capacitive acceleration sensors than earlier solutions, sensors applicable for use for reliable acceleration measuring particularly in small capacitive acceleration sensor solutions measuring acceleration in relation to several axes.

SUMMARY OF THE INVENTION

The object of the invention is an improved method of manufacturing a capacitive acceleration sensor, and an improved capacitive acceleration sensor. By means of this invention savings in the height of circuit board components are achieved, and it is applicable for use, in particular, in small capacitive acceleration sensor solutions measuring in relation to several axes.

According to a first characteristic of the invention, a method is provided for manufacturing a micromechanical sensor out of a wafer element, in which method an inertia mass forming a movable electrode supported by torsion springs symmetrically in the longitudinal direction of the mass and asymmetrically in relation to the thickness direction of the mass, is manufactured on a central wafer; and measuring electrodes are manufactured onto a second wafer, which electrodes are positioned facing a first side of the mass, symmetrically in relation to the torsion springs and the mass, such that asymmetrically positioned lightening features are manufactured into the mass of the acceleration sensor, on a second side of it, the one opposite to the first side.

Preferably, mass is removed at the lightening features by means of a machining method. Alternatively, mass is removed at the lightening features by means of an etching method.

Preferably, the movable electrode is manufactured utilizing a SOI wafer. Further, preferably, the SOI wafer is sealed by means of two sealing wafers. Further, preferably, the measuring electrodes are positioned on a first sealing wafer facing a first side of the mass, symmetrically in relation to the torsion springs and the mass. Further, preferably, the sealing wafer carrying the measuring electrodes is manufactured by means of a silicon-glass insulation technique. Further, preferably, after the joining, the first sealing wafer is made very thin by grinding.

Preferably, the second sealing wafer is made of glass. Further, preferably, the second sealing wafer is ground very thin.

According to a second characteristic of the invention, a capacitive acceleration sensor is provided, which capacitive acceleration sensor comprises an inertia mass forming a movable electrode supported by torsion springs symmetrically in the longitudinal direction of the mass and asymmetrically in the thickness direction of the mass, and measuring electrodes positioned facing a first side of the mass, symmetrically in relation to the torsion springs and the mass, such that the acceleration sensor further comprises asymmetrically positioned lightening features manufactured in the mass on a second side of it, the one opposite to the first side.

Preferably there is one lightening feature. Alternatively, there are several lightening features. Preferably, the shape of the lightening features varies.

Preferably, the acceleration sensor comprises three acceleration sensor elements, such that two of the masses are positioned side by side, as mirror images of each other in relation to the spring axis, and the third mass is turned by 90 degrees in relation to the first two.

Preferably, one of the masses is implemented with no lightening features. Further, preferably, the third mass is implemented with no lightening features. Alternatively, two of the masses are implemented with no lightening features.

BRIEF DESCRIPTION OF THE DRAWINGS

Below, the invention and its preferable embodiments are described in detail with exemplifying reference to the attached figures, of which.

FIGS. 1-4 were presented above. Below, the present invention and its preferred embodiments are described with reference to the FIGS. 5-9.

DETAILED DESCRIPTION OF THE INVENTION

Figure 5:
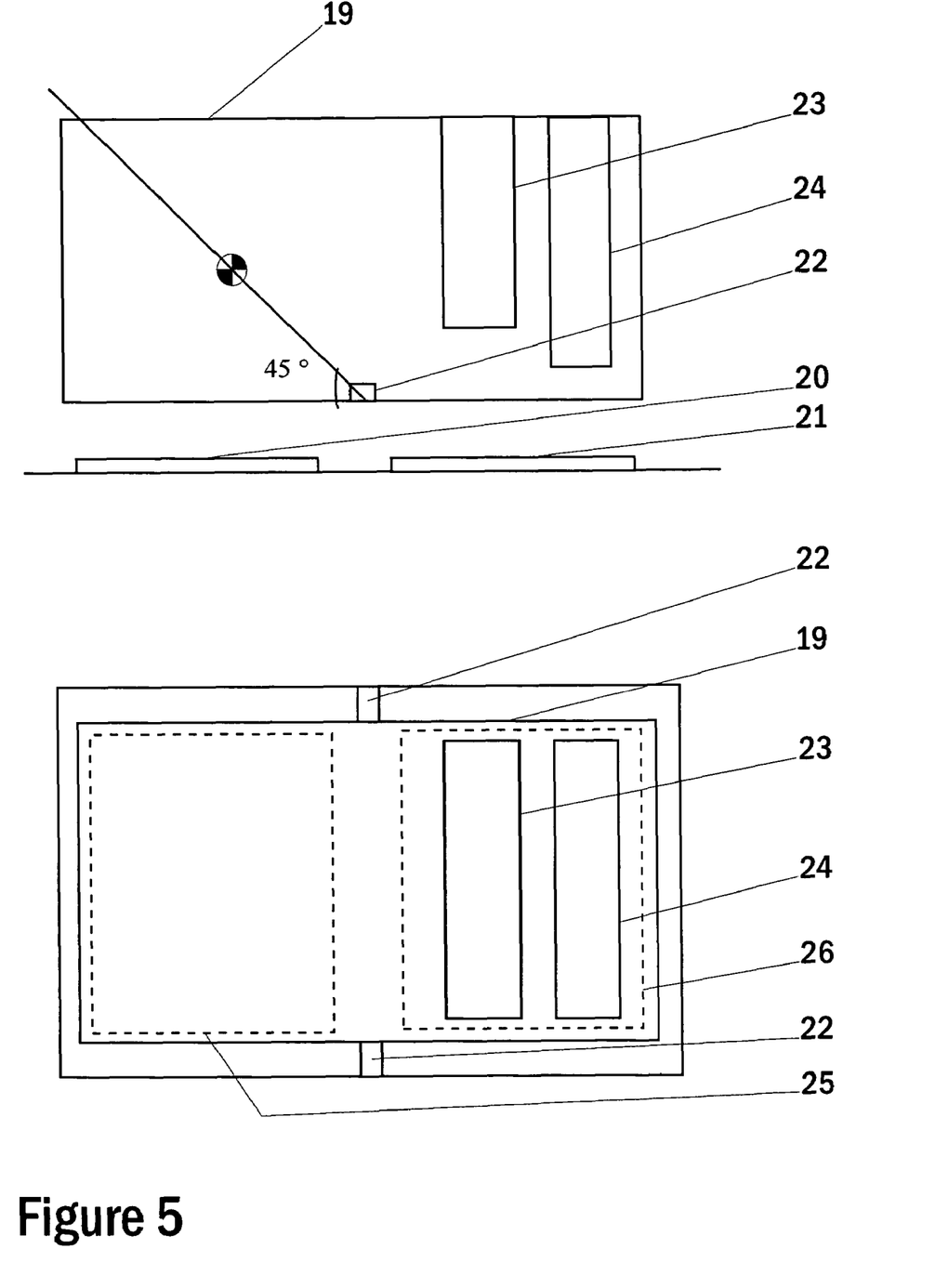
FIG. 5 shows a capacitive acceleration sensor solution, according to the invention, in section and projection view.

FIG. 5 shows a capacitive acceleration sensor solution, according to the invention, in section and projection view. In the capacitive acceleration sensor solution, according to the invention, an inertia mass 19 is supported by means of torsion springs 22, symmetrically in relation to the longitudinal direction of the mass 19, and asymmetrically in relation to the thickness direction of the mass 19. The measuring electrodes 20, 21 are positioned facing a first side of the mass 19, symmetrically in relation to the torsion springs 22 and the mass 19.

In the capacitive acceleration sensor solution, according to the invention, into the mass 19, on a second side of it, the one opposite to the first side, asymmetrically located lightening features 23, 24 are manufactured, which features displace the center of gravity of the mass 19 away from the lightening features 23, 24 in the longitudinal direction of the mass 19. In the projection view, the areas 25, 26 of the mass 19 coinciding with the measuring electrodes 20, 21 are depicted by a dotted line.

Some of the mass 19 has been removed at the lightening features 23, 24 by means of some known machining or etching method. There can be one or more lightening features 23, 24, and their shape can vary, and the shape can be freely selected.

The lightening features 23, 24 may not, however, extend through the mass 19, in which case they 23, 24 would decrease that area of the mass 19, which is available for the measuring electrodes 20, 21.

Figure 6:
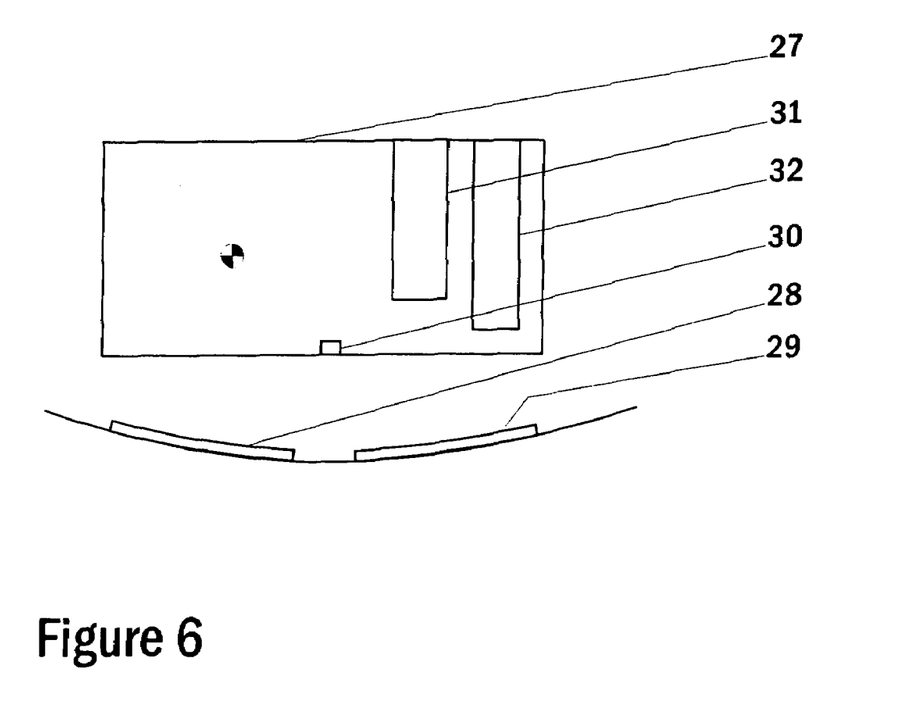
FIG. 6 shows the influence on the distance between the measuring electrode and the mass, from deformation in the capacitive acceleration sensor solution according to the invention.

FIG. 6 shows the influence on the distance between the measuring electrode and the mass, from deformation in the capacitive acceleration sensor solution according to the invention. In the capacitive acceleration sensor solution, according to the invention, the torsion springs 30 supporting the mass 27 of the movable electrode are positioned symmetrically in relation to the longitudinal direction of the mass 27 and asymmetrically in relation to the thickness direction. The measuring electrodes 28, 29 are positioned facing a first side of the mass 27, symmetrically in relation to the torsion springs 30 and the mass 27. Additionally, into the mass 27, on a second side of it, the one opposite to the first side, asymmetrically located lightening features 31, 32 have been manufactured.

The capacitive acceleration sensor solution shown in FIG. 6 tolerates deformations of the structure extremely well without generating measuring inaccuracies caused by null shift. The capacitive acceleration sensor solution according to the invention can very well be connected mechanically and electrically and be protected against chemical influences from the environment without fear of deformations in the structure causing significant measuring inaccuracies.

In the capacitive acceleration sensor solution according to the invention, shown in FIG. 6, the distances of the measuring electrodes 28, 29 change mutually in the same manner, whereby the capacitance difference will not change and no measuring errors are generated.

Figure 7:
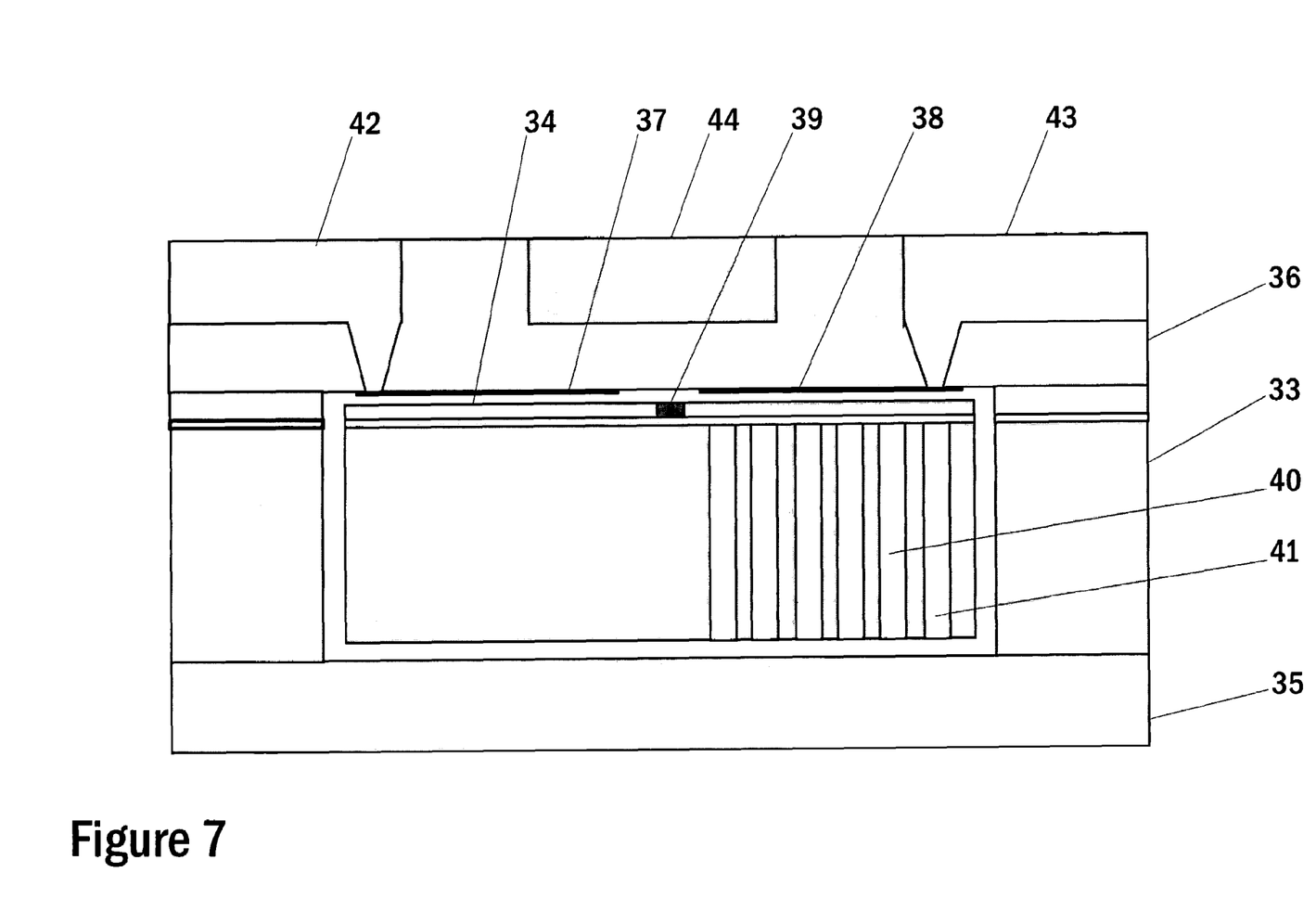
FIG. 7 shows an alternative capacitive acceleration sensor solution, according to the invention, in section view.

FIG. 7 shows an alternative capacitive acceleration sensor solution, according to the invention, in section view. In the alternative capacitive acceleration sensor solution according to the invention, the inertia mass 34 forming the movable electrode is supported by torsion springs 39, symmetrically in the longitudinal direction of the mass 34, and asymmetrically in the thickness direction. The movable electrode is manufactured by utilizing a SOI wafer 33 (SOI, Silicon On Insulator), the insulating layer of which is used for stopping the etching, and into the structure layer of which the torsion springs 39 are manufactured. The SOI wafer 33 is sealed by means of two sealing wafers 35, 36.

The measuring electrodes 37, 38 are positioned on the first sealing wafer 36 facing a first side of the mass 34, symmetrically in relation to the torsion springs 39 and the mass 34. The sealing wafer 36 carrying the measuring electrodes 37, 38 is manufactured by means of a silicon-glass insulation technology. After the joining, the first sealing wafer 36 can be ground very thin, even down to a thickness of 200 µm. Into the mass 34, on a second side, the one opposite to the first side, asymmetrically located lightening features 40, 41 are manufactured, which features displace the center of gravity of the mass 34 away from the lightening features 40, 41 in the longitudinal direction of the mass 34. Lead-ins 42, 43, 44 of the connection areas are implemented on the first sealing wafer 36.

In the alternative capacitive acceleration sensor solution according to the invention, the lightening features 40, 41 of the mass 34 are generated without any additional working step, at the same time as the inertia mass 34 is loosened from the sensor frame, and the torsion springs 39 are formed. In this acceleration sensor solution, the lightening features 40, 41 are implemented as a network of deep cavities.

The sealing wafer 35 on the other side of the mass can, for the sake of its cheapness and electrical insulation, be made of plain glass, and this wafer can also be ground very thin, even down to a thickness of 100 µm, since deformations in it has no influence on the characteristics of the sensor. Under these premises, the total thickness of the sensor can be even less than 600 µm, which enables an encapsulated sensor thickness of less than 1 mm.

In the following table, the dimensions x, y of a capacitive acceleration sensor and the number N of sensors obtainable out of a wafer of 150 mm as a function of the capacitance C of one capacitor. If requirements for a single capacitance value are set according to the table, the most preferable dimensions and the number of sensors obtainable out of a wafer turn out respectively according to that indicated in the table. In the calculations, a capacitor gap of 1.5 µm was assumed.

| C [pF] | x [mm] | y [mm] | N |
|---|---|---|---|
| 0.5 | 1.21 | 1.65 | 6043 |
| 0.7 | 1.31 | 1.80 | 5111 |
| 1.0 | 1.44 | 1.99 | 4200 |
| 1.5 | 1.62 | 2.26 | 3288 |
| 2.0 | 1.77 | 2.49 | 2729 |
| 3.0 | 2.03 | 2.88 | 2063 |

Figure 8:
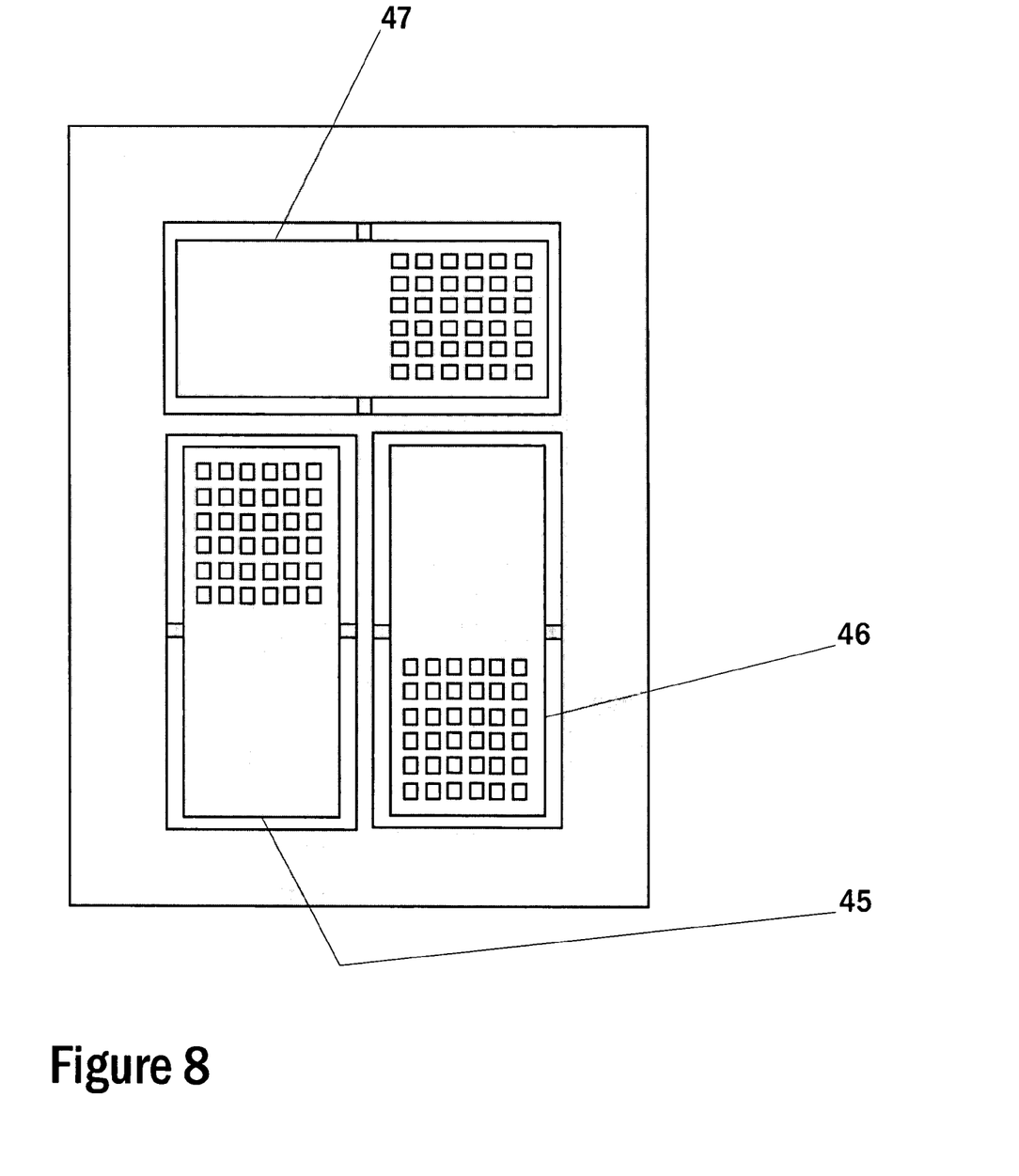
FIG. 8 shows a positioning solution of the alternative capacitive acceleration sensor elements, according to the invention, for measuring acceleration in relation to three axes.

FIG. 8 shows a positioning solution of the alternative capacitive acceleration sensor elements, according to the invention, for measuring acceleration in relation to three axes. In the positioning solution of the alternative capacitive acceleration sensor elements according to the invention, the masses 45, 46, 47 are replicated in triplicate.

Two of the masses 45, 46 are positioned side by side being mirror images of each other in relation to the spring axis. The masses 45, 46 located side by side detect accelerations in the directions y and z. The third mass 47 is turned by 90° in relation to these, and it detects accelerations in the directions x and z. The sensitivity of all the axes can be dimensioned independently of each other by means of the capacitive acceleration sensor solution according to FIG. 8.

Figure 9:
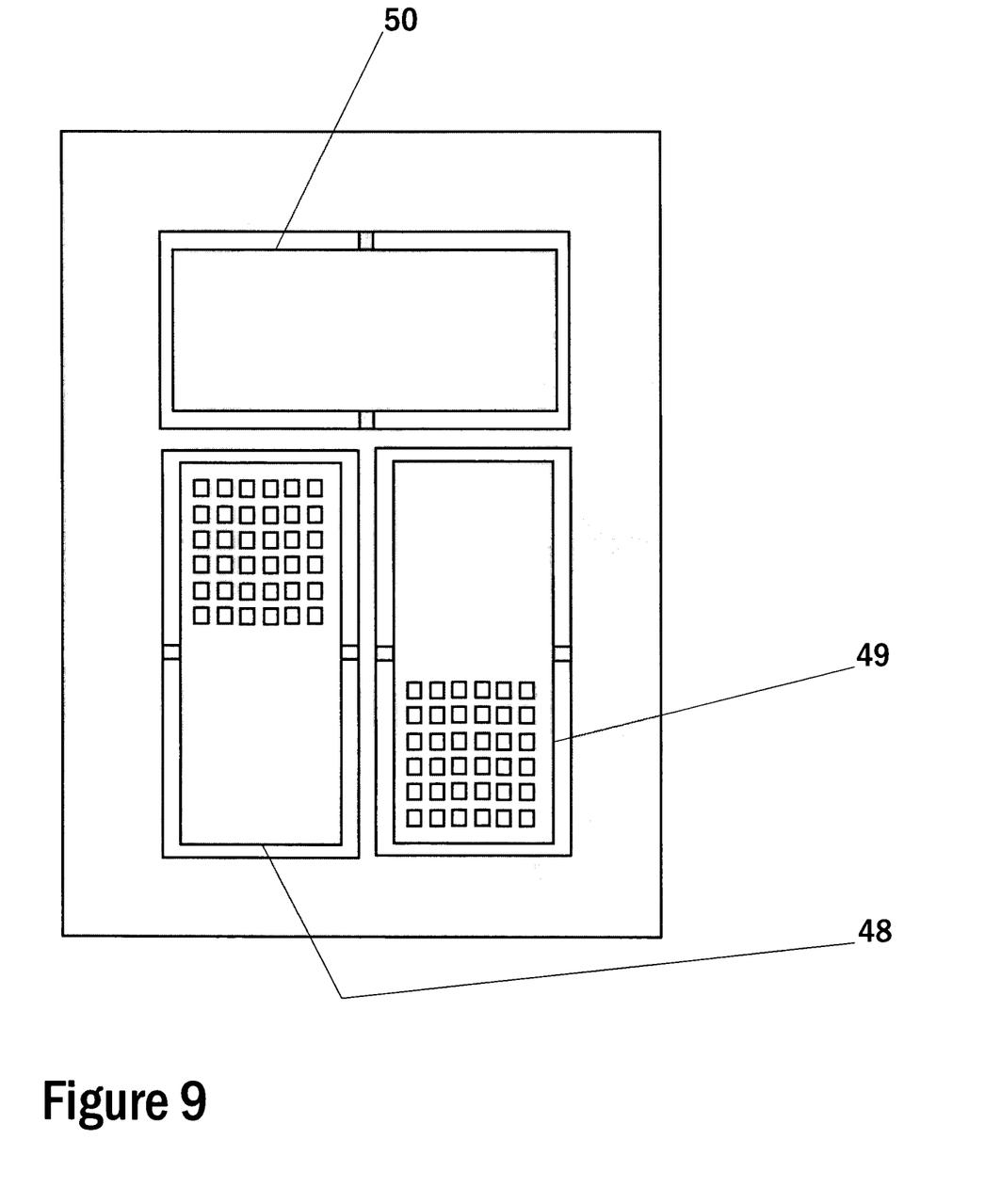
FIG. 9 shows an alternative positioning solution of the alternative capacitive acceleration sensor elements, according to the invention, for measuring acceleration in relation to three axes.

FIG. 9 shows an alternative positioning solution of the alternative capacitive acceleration sensor elements, according to the invention, for measuring acceleration in relation to three axes. In the alternative positioning solution of the alternative capacitive acceleration sensor elements according to the invention, the masses 48, 49, 50 are replicated in triplicate.

Two of the masses 48, 49 are positioned side by side being mirror images of each other in relation to the spring axis. The masses 48, 49 located side by side detect accelerations in the directions y and z. The third mass 50 is turned by 90° in relation to these. The third mass 50 is implemented with no lightening features, and it detects acceleration in just the direction x.

The sensitivity of all the axes can be dimensioned independently of each other by means of a capacitive acceleration sensor solution according to FIG. 8 or FIG. 9.

The capacitive acceleration sensor solution according to the invention simultaneously provides a fairly efficient area utilization as well as a good tolerance for deformations of the structure.

In the capacitive acceleration sensor solution according to the invention, there is no need to worry about the conductivity or electrical potential of any sealing structures located on the side of the inertia mass opposite to the electrodes, since that side of the mass is not used for electrically active functions. Further, in the capacitive acceleration sensor solution according to the invention, there is no need explicitly to see to it, that the electric conductivity between the sides of the inertia mass is maintained. The mass can be made of lightly doped silicon with the exception of the area on the side facing the electrodes, or it can contain buried boundary surfaces or insulation layers. Thus, significant savings in the manufacturing costs are achieved by means of the capacitive acceleration sensor solution according to the invention.

An advantage of the capacitive acceleration sensor solution according to the invention is also, that adjustment of the sensitivities in the vertical and horizontal directions is easily done by changing the angle of the perpendicular to the spring line passing through the center of gravity. If the angle is larger than 45°, a vertical sensitivity smaller than the horizontal sensitivity is achieved, which, in many practical applications, is advantageous.

The invention claimed is:

1. A method for manufacturing a capacitive acceleration sensor out of a wafer element, comprising:
    forming an inertia mass;
    forming a movable electrode on a central wafer, the mass being supported by torsion springs, symmetrically in the longitudinal direction of the mass, and asymmetrically in the thickness direction of the mass; and
    placing measuring electrodes on a second wafer, which electrodes are positioned facing a first side of the mass, symmetrically in relation to the torsion springs and the mass, wherein asymmetrically located lightening features are manufactured into the mass of the acceleration sensor, on a second side, the one opposite to the first side, said lightening features coinciding with the measurement electrodes and not extending through the mass.

2. The method according to claim 1, wherein some mass is removed at the lightening features by a machining method.

3. The method according to claim 1, wherein that some mass is removed at the lightening features by an etching method.

4. The method according to claim 1, wherein the movable electrode is formed utilizing a silicon on insulator (SOI) wafer.

5. The method according to claim 4, wherein the SOI wafer is sealed using two sealing wafers.

6. The method according to claim 5, wherein the measuring electrodes are positioned on the first sealing wafer facing a first side of the mass, symmetrically in relation to the torsion springs and the mass.

7. The method according to claim 6, wherein the sealing wafer carrying the measuring electrodes is manufactured using a silicon-glass insulation technology.

8. The method according to claim 7, wherein after joining, the first sealing wafer is ground down extremely thin to approximately 200 micro-meters.

9. The method according to claim 6, wherein the second sealing wafer is made of glass.

10. The method according to claim 9, wherein the second sealing wafer is ground down extremely thin to approximately 200 micro-meters.

11. A capacitive acceleration sensor comprising:
    an inertia mass forming a movable electrode, the mass being supported by torsion springs, symmetrically in the longitudinal direction of the mass, and asymmetrically in the thickness direction of the mass;
    measuring electrodes positioned facing a first side of the mass, symmetrically in relation to the torsion springs and the mass; and
    at least one asymmetrically located lightening feature manufactured into the mass, on a second side of it, the one opposite to the first side, said at least one lightening feature coinciding with the measurement electrodes and not extending through the mass.

12. Acceleration sensor according to claim 11, wherein there is one lightening feature.

13. Acceleration sensor according to claim 11, wherein there are several lightening features.

14. Acceleration sensor according to claim 11, wherein the shape of the lightening features varies.

15. Acceleration sensor according to claim 11, further comprising:
    an acceleration sensor which comprises three acceleration sensor elements, such that two of the masses are positioned side by side being mirror images of each other in relation to the spring axis, and the third mass is turned by 90° in relation to the first two masses.

16. Acceleration sensor according to claim 15, wherein one of the masses is implemented with no lightening features.

17. Acceleration sensor according to claim 16, wherein the third mass is implemented with no lightening features.

18. Acceleration sensor according to claim 15, wherein two of the masses are implemented with out lightening features.

* * * * *